(12) United States Patent
Zhao et al.

(10) Patent No.: US 12,524,663 B2
(45) Date of Patent: Jan. 13, 2026

(54) METHOD FOR DETERMINING CONTINUOUS INFORMATION ON AN EXPECTED TRAJECTORY OF AN OBJECT

(71) Applicant: Aptiv Technologies AG, Schaffhausen (CH)

(72) Inventors: Kun Zhao, Duisburg (DE); Ido Freeman, Dusseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 974 days.

(21) Appl. No.: 17/125,783

(22) Filed: Dec. 17, 2020

(65) Prior Publication Data

US 2021/0192347 A1 Jun. 24, 2021

(30) Foreign Application Priority Data

Dec. 20, 2019 (EP) .................................. 19219051

(51) Int. Cl.
*G01S 13/931* (2020.01)
*G01S 17/66* (2006.01)
(Continued)

(52) U.S. Cl.
CPC ............. *G06N 3/08* (2013.01); *G05D 1/0221* (2013.01); *G06N 3/04* (2013.01); *G05D 1/0088* (2013.01); *G08G 1/16* (2013.01)

(58) Field of Classification Search
CPC .......... G06N 3/08; G06N 3/045; G06N 3/084; G06N 20/00; G08G 1/16; G01S 13/726;
(Continued)

(56) References Cited

U.S. PATENT DOCUMENTS

2017/0147888 A1 5/2017 Zeng
2017/0293837 A1 10/2017 Cosatto et al.
(Continued)

FOREIGN PATENT DOCUMENTS

CN  111401419  7/2020
DE  102016122190  5/2017
(Continued)

OTHER PUBLICATIONS

Danelljan et al., "Beyond Correlation Filters: Learning Continuous Convolution Operators for Visual Tracking", Springer, 2016. (Year: 2016).*
(Continued)

*Primary Examiner* — Kamran Afshar
*Assistant Examiner* — Steven Phung
(74) *Attorney, Agent, or Firm* — Harness, Dickey & Pierce, P.L.C.

(57) ABSTRACT

Computer-implemented method for determining continuous information on an expected trajectory of an object, the method comprising at least the following steps carried out by computer hardware components: determining data related to an expected trajectory of an object; and determining at least one parameter value for a continuous function on the basis of the data, wherein the continuous function and the at least one parameter value represent continuous information on the expected trajectory of the object.

14 Claims, 2 Drawing Sheets

(51) Int. Cl.

| | |
|---|---|
| *G01S 17/931* | (2020.01) |
| *G05D 1/00* | (2006.01) |
| *G06F 30/15* | (2020.01) |
| *G06F 30/27* | (2020.01) |
| *G06N 3/04* | (2023.01) |
| *G06N 3/045* | (2023.01) |
| *G06N 3/0464* | (2023.01) |
| *G06N 3/08* | (2023.01) |
| *G06N 3/084* | (2023.01) |
| *G06N 3/09* | (2023.01) |
| *G06N 20/00* | (2019.01) |
| *G06V 20/58* | (2022.01) |
| *G08G 1/16* | (2006.01) |

(58) Field of Classification Search
CPC ...... G01S 13/723; G01S 17/66; G01S 13/931; G06V 20/58; G06F 30/15; G06F 30/27; G06F 2119/12
See application file for complete search history.

(56) References Cited

U.S. PATENT DOCUMENTS

| | | | | |
|---|---|---|---|---|
| 2017/0363430 | A1* | 12/2017 | Al-Dahle | G01C 21/3815 |
| 2018/0012092 | A1* | 1/2018 | Gleeson-May | G06V 10/95 |
| 2018/0089515 | A1 | 3/2018 | Yang et al. | |
| 2018/0232585 | A1 | 8/2018 | Kim | |
| 2019/0026597 | A1 | 1/2019 | Zeng et al. | |
| 2019/0049987 | A1 | 2/2019 | Djuric et al. | |
| 2019/0065878 | A1 | 2/2019 | Zeng et al. | |
| 2019/0161080 | A1 | 5/2019 | Gochev et al. | |
| 2019/0179328 | A1 | 6/2019 | Movert et al. | |
| 2020/0019794 | A1 | 1/2020 | Engelcke et al. | |
| 2020/0057141 | A1 | 2/2020 | Kim | |
| 2020/0139975 | A1* | 5/2020 | Ishikawa | B60W 40/04 |
| 2021/0107532 | A1 | 4/2021 | Zhao et al. | |
| 2021/0271252 | A1 | 9/2021 | Zhao et al. | |

FOREIGN PATENT DOCUMENTS

| | | |
|---|---|---|
| DE | 102018117777 | 1/2019 |
| DE | 102018120405 | 2/2019 |
| DE | 102017121052 | 3/2019 |
| EP | 1779295 | 5/2007 |
| EP | 2765533 | 8/2014 |
| EP | 2784722 | 10/2014 |
| EP | 3438872 | 2/2019 |
| EP | 3839805 | 6/2021 |
| WO | 2016130719 | 8/2016 |
| WO | 2017177005 | 10/2017 |
| WO | 2018204656 | 11/2018 |

OTHER PUBLICATIONS

Morwald et al., "Advances in real-time object tracking", J Real-Time Image Proc, 2015. (Year: 2015).*
TaheriNejad et al., "Improved Machine Learning using Confidence", IEEE, May 2019. (Year: 2019).*
Chen et al., "A Novel Curve Fitting Based Discrete Velocity Estimator for High Performance Motion Control", 2012 IEEE/ASME International Conference on Advanced Intelligent Mechatronics. (Year: 2012).*
"Extended European Search Report", EP Application No. 19202631.8, Apr. 16, 2020, 12 pages.
"Extended European Search Report", EP Application No. 20159899.2, Sep. 1, 2020, 11 pages.
Alahi, et al., "SocialLSTM: Human Trajectory Prediction in Crowded Spaces", Jun. 2016, 11 pages.
Ba, "Blending Diverse Physical Priors with Neural Networks", Oct. 1, 2019, 15 pages.
Bahram, et al., "A Combined Model- and Learning-Based Framework for Interaction-Aware Maneuver Prediction", Abstract Only, Jan. 7, 2016, 2 pages.
Bansal, "ChauffeurNet: Learning to Drive by Imitating the Best and Synthesizing the Worst", Dec. 7, 2018, 20 pages.
Culurciello, "The fall of RNN / LSTM", Apr. 13, 2018, 10 pages.
Kerfs, "Models for Pedestrian Trajectory Prediction and Navigation in Dynamic Environments", May 2017, 146 pages.
Lefevre, et al., "A Survey on motion prediction and risk assessment for intelligent vehicles", Jul. 2014, 20 pages.
Li, et al., "Fusion Modeling Method of Car-Following Characteristics", Nov. 2019, 8 pages.
Park, et al., "Sequence-to-Sequence Prediction of Vehicle Trajectory via LSTM Encoder-Decoder Architecturef", Oct. 22, 2018, pp. 1672-1678.
Particke, et al., "Neural Network Aided Potential Field Approach for Pedestrian Prediction", Oct. 5, 2019, 6 pages.
Zernetsch, et al., "Trajectory Prediction of Cyclists using a physical model and an artificial neural network", Jun. 2016, pp. 833-838.
Zhao, "Multi-Agent Tensor Fusion for Contextual Trajectory Prediction", Jul. 28, 2019, 9 pages.
"Extended European Search Report", EP Application No. 19219051.0, Jul. 23, 2020, 11 pages.
Dequaire, et al., "Deep Tracking in the wild: End-to-end tracking using recurrent neural networks", Jun. 22, 2017, pp. 492-512, 21 pages.
Gupta, et al., "Social GAN: Socially Acceptable Trajectories with Generative Adversarial Networks", Mar. 29, 2018, 10 pages.
He, "Deep Residual Learning for Image Recognition", Dec. 10, 2015, 12 pages.
Lee, et al., "Desire: Distant Future Prediction in Dynamic Scenes with Interacting Agents", Apr. 14, 2017, 10 pages.
Lin, et al., "Focal Loss for Dense Object Detection", Feb. 7, 2018, 10 pages.
Luo, et al., "Fast and Furious: Real Time End-to-End 3D Detection, Tracking and Motion Forecasting with a Single Convolutional Net", Jun. 2018, pp. 3569-3577, 9 pages.
Makansi, et al., "Overcoming Limitations of Mixture Density Networks: A Sampling and Fitting Framework for Multimodal Future Prediction", Jun. 8, 2020, 18 pages.
Min, et al., "RNN-Based Path Prediction of Obstacle Vehicles With Deep Ensemble", Jul. 23, 2020, 5 pages.
Musicki, et al., "Joint Integrated Probabilistic Data Association—JIPDA", Aug. 2004, pp. 1120-1125, 6 pages.
Sadeghian, et al., "SoPhie: An Attentive GAN for Predicting Paths Compliant to Social and Physical Constraints", Jun. 2018, pp. 1349-1358, 10 pages.
"Extended European Search Report", EP Application No. 20187694.3, Dec. 3, 2020, 14 pages.
Wang, et al., "Robust and Fast Vehicle Turn-counts at Intersections via an Integrated Solution from Detection, Tracking and Trajectory Modeling", Jun. 14, 2020, 9 pages.
Xue, et al., "Pedestrian Tracking and Stereo Matching of Tracklets for Autonomous Vehicles", Apr. 28, 2019, 5 pages.
"Foreign Office Action", EP Application No. 19219051.0, May 3, 2023, 6 pages.
Sun, et al., "Probabilistic Prediction of Interactive Driving Behavior via Hierarchical Inverse Reinforcement Learning", Sep. 9, 2018, 7 pages.

* cited by examiner

METHOD FOR DETERMINING CONTINUOUS INFORMATION ON AN EXPECTED TRAJECTORY OF AN OBJECT

CROSS-REFERENCE TO RELATED APPLICATION

This application claims priority to European Patent Application Number 19219051.0, filed Dec. 20, 2019, the disclosure of which is hereby incorporated by reference in its entirety herein.

TECHNICAL FIELD

The present disclosure relates to a computer-implemented method for determining continuous information on an expected trajectory of an object.

BACKGROUND

Digital imaging devices, such as digital cameras, are used in automotive applications to capture the vicinity of a vehicle, for example in a busy traffic environment. Other types of sensors, such as radar or LiDAR, can be used for the same purpose. However, it is not trivial to determine desired semantic information from the sensor data or the various types of sensor data. Particularly, information about the future movement of traffic objects (e.g., vehicles, bicycles, or pedestrians) is one example of such information, which needs to be determined from sensor data. The future or expected trajectory, i.e. path of movement of an object is relevant in order to automatically control a vehicle in a safe manner. In this regard, it is possible to predict data samples for future points in time on the basis of current sensor data samples. However, due to the pointwise or discrete nature of the data samples the result would be a coarse prediction on the expected movement. This is insufficient for a precise calculation of safe steering maneuvers at any point in time, for example for an autonomous vehicle. Increasing the number of predictions per time span could alleviate this problem but raises a conflict with limited processing resources in a vehicle being capable to generate predictions at real time.

SUMMARY

The present disclosure provides a computer-implemented method, a computer system and a non-transitory computer readable medium according to the independent claims. Embodiments are given in the subclaims, the description and the drawings.

In one aspect, the present disclosure is directed at a computer-implemented method for determining continuous information on an expected trajectory of an object, the method comprising at least the following steps carried out by computer hardware components: determining data, the data being related to the expected trajectory of the object; and determining at least one parameter value for a continuous function on the basis of the data, wherein the continuous function and the at least one parameter value represent continuous information on the expected trajectory of the object, and wherein the at least one parameter value is determined by using a machine-learning model.

It has been found that continuous information on the expected trajectory of an object can be provided with a continuous function and at least one parameter value for the continuous function by using a machine-learning model. In this way, the information on the expected trajectory is provided with respect to a time period or range rather than just a point or sample in time. This allows for any desired time resolution of the expected trajectory and a time-dependent behavior of the object is precisely taken into account. As a result, a precise and safe generation of automatic control functions of a vehicle can be carried out on the basis of the determined information for any required point in time. This means that less precise assumptions about the expected trajectory on the basis of only a few separate data samples can now be avoided. A machine-learning model is capable to provide this information with high validity. The machine-learning model can be a mathematical model trained by a machine-learning algorithm, for example an artificial neural network or a support-vector machine. The training can be carried out on the basis of known trajectories of objects, for example using backpropagation.

It is preferred that the at least one parameter value is directly determined by using the machine-learning model. This means that the one or more parameter values are preferably the output of the machine-learning model, for example of a neural network. The use of additional rules outside the scope of the machine-learning model, for example additional mathematical models can be excluded from determining the parameter value.

The continuous function is a mathematical function that can be expressed in closed form and is well suitable for implementation on a computer system. It is also possible that only the parameter values are determined while the continuous function can be predetermined except from parameter values for the parameters of the function. In this way, the processing effort for determining the information on the expected trajectory is significantly reduced, for example compared to determining a plurality of separate data points of the expected trajectory. The same holds for confidence information related to the expected trajectory or similar information. As another aspect, the accuracy of the expected trajectory or the related information is increased compared to predicting separate data points. This is due to the continuous nature of the information, which provides information on the expected trajectory with respect to any desired point in time rather than just sampled, i.e. limited points in time.

The continuous information can generally describe the shape of the expected trajectory but is not limited thereto. For example, the continuous information can represent confidence information of at least one parameter. In one example, at least one parameter value represents a confidence value (for example variance) for the continuous function, in particular for a parameter value of the continuous function.

The term expected trajectory indicates that the object trajectory is predicted. This is done on the basis of data, which can be sensor data determined by the sensor mounted on another object, in particular a vehicle located nearby the object for which the trajectory information is determined. The data is preferably determined at a first time, which is different to a second time that is assigned to the expected trajectory. For example, sensor data can be determined at a first point of time, e.g. in form of a radar scan, which captures for example the respective object and other possibly interacting objects. It is assumed that objects will avoid collisions, so their trajectories can be dependent on each other. The radar scan for the second time is not available because the second time is preferably a future time. In order to determine the desired information on the expected trajectory of the object that is preferably captured by means of the radar scan, it is proposed to determine one or more parameter values for a continuous function, wherein the continuous function and the one or more parameter values together represent the information on the expected trajectory of the object. While the second time is preferably a time period subsequent to the first-time other time relations are also possible.

The data related to the expected trajectory can be any data that possibly affects the trajectory of the object. The data can be data representing the object, other objects in the vicinity, the environment (for example the road and obstacles). In addition, other environmental data can be used, for example the temperature, or other information about the environmental conditions, e.g. weather. In one example, during heavy rain or snow, the expected trajectory might be different compared to excellent weather conditions. This information can also be represented as confidence information, as will be described further below.

While the expected trajectory can refer to self-moving objects, such as vehicles and pedestrians, also stationary objects can be considered. For example, due to ego motion of a vehicle objects sensed by a sensor of the vehicle are moving relative to the vehicle and a trajectory can be determined on the basis of the relative movement, for example a trajectory of a road or another object. In principle, the shape of objects, for example the course of a road can be described by the continuous information.

It is understood that a plurality of parameter values can be assigned for the continuous function, which may be denoted a set of parameter values for the continuous function. For example, sets of parameter values can be determined for a plurality of continuous functions, respectively. In general, more than one continuous function can be provided.

Embodiments are disclosed in the description, the dependent claims, and the drawings.

According to an embodiment, the continuous function represents a function value on the basis of a continuous variable, preferably a continuous-time variable, and at least one parameter that is set to the at least one parameter value. The continuous function is preferably a real-valued function. Furthermore, the term continuous function can be understood in the sense that the graph of the function does not comprise interruptions or holes. In more simple terms, the graph can be drawn as a continuous line. In this regard, the continuous variable can be set to an arbitrary real value, preferably within a defined range of the continuous function.

The continuous function can be predefined and for example stored in a computer system. Only the parameter values for the continuous function need to be determined, which renders the step of determining the continuous information compact. The particular type of continuous function can be chosen with respect to several assumptions about the expected trajectory of a given object. For example, if only a certain range of maneuvers are to be expected the continuous function can be chosen accordingly. In one example, the continuous function can be chosen so that maneuvers of a passenger car can be modelled adequately. Other functions may be chosen for a trucks, buses, or pedestrians. In another example, the same continuous function is chosen for all objects. It is understood that the term continuous function indicates the function in a general, in particular mathematical sense, e.g. with a variable and one or more parameters. The parameter values for parameters define a particular instance of the continuous function.

According to an embodiment, the at least one parameter value is determined by using an artificial neural network. In this way, the one or more parameter value can be determined with high accuracy and with low processing effort. Particularly, an artificial neural network is capable to process a substantial amount of data with high efficiency and accuracy. In one example, the artificial neural network is a convolutional neural network. This is suitable for processing complex sensor data, such as radar sensor data or image data. As an alternative to a neural network other types of machine-learning models or artificial intelligence can also be used for determining the one or more parameter value for a continuous function.

According to an embodiment, the artificial neural network comprises a plurality of layers, wherein the at least one parameter value comprises a plurality of parameter values, wherein at least some of the plurality of parameter values are respectively determined by a respective one of the plurality of layers of the artificial neural network. In other words, the layer structure of the neural network corresponds to a structure of the parameter values, which can be structured in groups of parameter values with respect to one or more continuous functions. In one example, a plurality of sets of parameter values are respectively assigned to a respective one of a plurality of continuous functions. This is, a first set of parameter values is assigned to a first continuous function and a second set of parameter values is assigned to a second continuous function, wherein the first and second continuous functions can be equivalent of different. The first set of parameter values can be determined by using a first layer of the neural network and the second set of parameter values can be determined by using a second layer of the neural network. Using dedicated layers for the parameter values of continuous functions allows for a compact neural network, which performs with high efficiency and accuracy. Moreover, manual tuning of individual layers of the neural network can be done if desired. Alternatively, at least some or all of the plurality of parameter values can be determined by a single one of the plurality of layers of the artificial neural network. Also combinations can be used, i.e. the parameter values for one function are determined by a single layer, wherein the parameter values for another function are determined by using different layers.

According to an embodiment, the continuous function forms a polynomial function. Using polynomial functions has shown to provide a suitable mathematical model for determining trajectories of common objects in various traffic scenarios. Moreover, a polynomial function is able to model the expected range of possible trajectories, wherein unlikely trajectories or maneuvers of the objects are avoided. As another aspect, parameter values for a polynomial function can be determined with very high efficiency. Particularly, algorithms for fitting a polynomial function are available in the art. As indicated, a neural network can also be used. Instead of polynomials, other types of continuous functions can be used, for example splines.

According to an embodiment the polynomial function has a degree of at least one, for example at least two, in one example four. A degree of four can provide a good compromise for modelling a true trajectory with high accuracy and efficiency. However, higher degree polynomial functions or first-order polynomial functions (degree one) can also be used, if desired.

According to an embodiment, the at least one parameter value comprises at least one first parameter value and at least one second parameter value, wherein a first continuous function and the at least one first parameter value represent the expected trajectory of the object in a first dimension, wherein a second continuous function and the at least one second parameter value represent the expected trajectory of the object in a second dimension. The first and second dimension can be spatial dimensions, for example orthogonal dimensions. Other types of dimensions are also possible and can be dependent on the spatial representation of objects, for example the type of coordinate system. In one example, the first and second continuous functions can be associated with spatial dimensions having continuous time dependency, e.g., x(t) and y(t), wherein x and y denote for example orthogonal or polar spatial dimensions and t represents continuous time. However, in another example, the second continuous function can be dependent on the first continuous function, e.g. x(t) and y(x). Other forms of dimensions are also possible. In particular, a dimension can be a velocity-related dimension, for example velocity or acceleration. A dimension can also represent a statistical dimension, for example confidence, for example variance. In principle, a dimension can be related to any desired measurand.

It is understood that any desired number of continuous functions can be used and that the parameter values can refer to any desired number of continuous functions. For example, more than two continuous functions can be used for determining the continuous information.

In one example, the first and second continuous functions are polynomial functions, wherein each of the functions comprises a set of parameters, i.e. the first continuous function comprises a first set of parameters and the second continuous function comprises a second set of parameters. Likewise, a first set of parameter values is used to set the first parameter set and a second set of parameter values is used to set the second parameter set. As indicated further above the first set of parameter values can be determined by using a first layer of an artificial neural network and the second set of parameter values can be determined by using a second layer of the artificial neural network.

According to an embodiment the first continuous function and the second continuous function are equivalent. For example, the first and second continuous functions can both be a polynomial function, in particular of fourth order. This can generally be expressed as $p(x)=a*x^4+b*x^3+c*x^2+d*x+e$, wherein [a, b, c, d, e] is a set of parameters of the continuous function p(x). The continuous variable x can be the continuous-time variable. The set of parameter values [a, b, c, d, e] can be set according to a set of parameter values, e.g. [0.5, 1, 3, 0.8, 0.5].

According to an embodiment the at least one parameter value comprises at least one third parameter value, wherein a third continuous function and the at least one third parameter value represent confidence values for the expected trajectory of the object. The third continuous function can generally be a continuous function in addition to another continuous function (e.g. a first and/or second continuous function) representing the trajectory of the object in a dimension. The other continuous function can be provided from an external source and the determining of the other continuous function and/or its parameter values is not necessarily part of the method disclosed herein although this can be done, if desired. For example, the parameter value for the third continuous function can be determined by the method disclosed herein. The parameter value and the third continuous function represent confidence information for another continuous function, wherein the other continuous function and its parameter values represent the trajectory of an object and form an input for the machine-learning model. The third continuous function can be regarded as a supplementary function that provides continuous confidence information on the expected validity of another continuous function with its parameters set to the determined values. For example, the third function with its parameters set to the third parameter values can represent the expected error between the other continuous function and the true trajectory of an object. This can represent the propagated error (or uncertainty) with respect to the parameters of the first and/or second continuous function. The third continuous function allows for an adaptive processing of the information on the expected trajectory, i.e. processing on the basis of the third continuous function and the at least one third parameter value. If, for example, the confidence is low the influence of the expected trajectory on the generation of automatic steering commands can be reduced, possibly up to zero.

The confidence represented by the third continuous function can refer to the first and/or second continuous function. This means that the probabilistic or expected validity of the first and/or second continuous function is captured by the third continuous function (including the respective parameter values).

According to an embodiment at least one confidence value is generated for the at least one parameter value. For example, a confidence value can be generated for each of a plurality of parameter values, respectively, for example for the first and/or second continuous function. A confidence value can be provided per parameter. This enables uncertainty propagation so that the expected error (or uncertainty) can be provided for the one or more continuous functions. The at least one confidence value can be generated by using the machine-learning model, in particular neural network, which is used for determining the one or more parameters. The at least one parameter determined by the machine learning model can be formed by the at least one confidence value. Multivariate Gaussian variances can be used to generate the confidence value, wherein a negative log-likelihood formulation can be used for estimation. Proper propagation of the confidence value can then be carried out with respect to the continuous function.

In general, at least some steps of the method described herein can be repeated, for example during subsequent points in times. This allows for obtaining the information on the expected trajectory in a time-adaptive manner, e.g. the expected trajectory can be updated, which can be done regularly with a repetition rate, in particular periodically.

According to an embodiment at least some steps of the method are repeatedly carried out with a repetition rate, wherein the repetition rate is varied on the basis of a confidence value for the expected trajectory of the object (e.g., as represented by the third continuous function and the at least one third parameter) and/or a confidence value for the at least one parameter value (e.g., the generated confidence value). For example, portions of relatively high confidence can be detected (e.g., in the third continuous function), wherein the repetition rate can be reduced during detected portions of relatively high confidence. In this way, the processing effort can be reduced during time periods, which do not require a frequent update of the expected trajectory due to the relatively high confidence.

In general, a confidence value can represent a standard deviation or a variance of an expected error distribution.

According to an embodiment determining the at least one parameter value does not comprise interpolating between data points of the expected trajectory of the object at the second time. The continuous function represents a true prediction that is distinguished from an ex-post interpolation between given data samples. Interpolation is thus regarded as no information gain compared to the samples alone. In contrast, the continuous function provides true continuous information for an arbitrary value of the continuous-time variable.

It is understood that the method can be carried out for a plurality of objects, i.e. the individual expected trajectories of the objects can be determined. This can be done on the basis of the same data, which captures the plurality of objects and/or their vicinity. Possible interactions between objects can then be considered effectively, hence further improving the accuracy of the determined information on the expected trajectory.

In another aspect, the present disclosure is directed at a computer-implemented method for training an artificial neural network for determining information on an expected trajectory of an object. The method comprises training the artificial neural network using backpropagation, wherein positions of the object are sampled at random from training data, wherein a loss or error function is evaluated on the basis of the sampled positions, wherein function values of the continuous function are evaluated for sample values of the continuous function. The sample values are associated with the sample positions. Overfitting of the continuous function can thus be avoided. It is understood that the training data and/or the continuous function can be used in different representations, if desired. For example, the continuous function or portions of the continuous function can be transformed into different coordinate systems or otherwise adapted to facilitate comparison with the training data. Training data can comprise known continuous functions, which facilitates training even further.

In another aspect, the present disclosure is directed at a computer system, said computer system being configured to carry out several or all steps of the computer-implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the disclosure is directed at a vehicle comprising at least one sensor for determining sensor data, the sensor data representing a vicinity of the vehicle with at least one moveable object located in the vicinity, wherein the vehicle further comprises a computer system receiving the sensor data from the at least one sensor and determining an expected trajectory of the at least one object on the basis of the sensor data. The computer system can be configured to carry out several or all steps of the computer-implemented method described herein. While sensor data of the vehicle can be a primary source of data it is possible to use other data sources as well. For example, the vehicle can comprise a communication device for communicating with other vehicles in the vicinity, thus forming a communication network with other vehicles. The respective vehicle, which may be denoted as host vehicle, can then receive sensor data from other vehicles via the communication network, e.g. motion data of other vehicles. This data can be processed together with the sensor data of the host vehicle in order to increase the validity of the information on the expected trajectory. In the same manner, other types of data, for example concerning the environmental conditions, can be used also.

In another aspect, the disclosure is directed at a computer-implemented method for controlling a vehicle on the basis of information on an expected trajectory, the method comprising: determining the information on the expected trajectory of at least one object located in a vicinity of the vehicle; and controlling the vehicle on the basis of the information on the expected trajectory of the at least one object. The information can be determined on the basis of data, in particular sensor data, as described further above. Likewise, other features and embodiments described herein can be part of the method. For example, the information on the expected trajectory can comprise the first, second and/or third continuous function and the assigned parameter values or sets of parameter values. It is possible that only the parameter values are determined, wherein the continuous functions are stored in a storage device of the computer system.

In another aspect, the present disclosure is directed at a non-transitory computer readable medium comprising instructions for carrying out several or all steps or aspects of the computer-implemented methods described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage. It can be connected to a vehicle in order to carry out the method for one or more objects in the vicinity of the vehicle.

The present disclosure is also directed at a computer program for instructing a computer to perform several or all steps or aspects of the computer-implemented methods described herein.

BRIEF DESCRIPTION OF THE DRAWINGS

Exemplary embodiments and functions of the present disclosure are described herein in conjunction with the following drawings, showing schematically.

DETAILED DESCRIPTION

Given the above background, there is a need to provide an improved method for determining information on the expected trajectory of an object.

Figure 1:
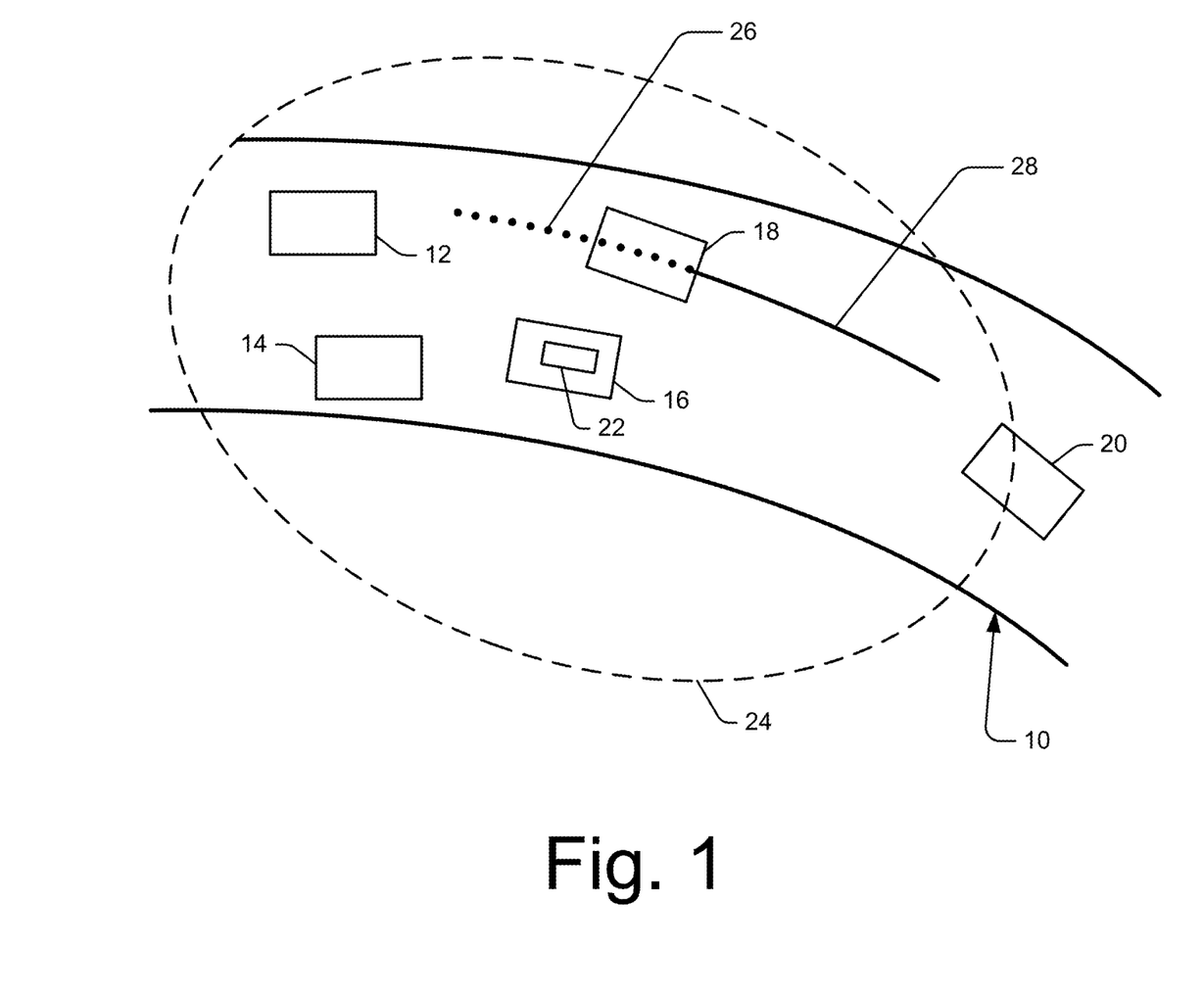
FIG. 1 a road with a plurality of moving objects, wherein an expected trajectory is determined for one of the objects.

FIG. 1 depicts a road 10, which is curved. Other shapes of roads are possible, i.e. the road 10 is just an example. A plurality of objects 12, 14, 16, 18, 20 are moving on the road 10 from the left side to the right side of FIG. 1. The objects 12, 14, 16, 18, 20 represent vehicles, for example passenger cars. While the objects 12 to 20 are all travelling along the road 10 in roughly the same direction the individual motion of the objects 12 to 20 can vary between the objects, for example with respect to velocity and current steering direction. This is to say that the trajectories of the individual objects 12 to 20 are different.

The vehicle 16 comprises a sensor unit 22 for determining sensor data, which captures a vicinity around the vehicle 16. In this regard, the sensor unit 22 has range 24, wherein the objects 12 to 20 are all at least partially within the range 24. The sensor data is determined at a predefined repetition rate so that the sensor unit 22 provides data representing the current vicinity, in particular the position and/or motion of the objects 12 to 20. This is to say that the sensor unit 22 provides data about all the objects 12 to 20 including object 16 on which the sensor unit 22 is mounted. Preferably, the sensor unit 22 includes a plurality of sensors with at least partially different field of views. In this way, the data provides an all-round visibility with respect to object 16. However, other configurations are possible and the range 24 can have a different shape than shown in FIG. 1. It is understood that different data types, for example camera images, radar scans, LiDAR scans and the like can be fused in order to obtain a unified spatial representation of the current vicinity of the object 16.

The data determined by the sensor unit 22 is related to the expected trajectory of the object 18. This is due to the assumption that the trajectory of the object 18 is influenced by at least some of the objects, for example object 16, object 20, and object 18. In one example, the data determined by the sensor unit 22 represents the vicinity 24 at a first time, in particular during a first time period. A first trajectory 26 is shown as a dotted line in FIG. 1 and represents the trajectory of the object 18, which has been measured on the basis of the sensor data. The sensor data is then processed by the computer system (not shown) in order to determine the expected trajectory 28, which the object 18 is expected to move along during the second time period, which is subsequent to the first time period. The second or expected trajectory 28 is determined by a first set of parameter values for a first continuous function and a second set of parameter values for a second continuous function. In addition, a third set of parameter values is determined for a third continuous function, which represents the confidence of the first continuous function and the second continuous function including their assigned parameter values. As confidence, multivariate Gaussian variances can be used, and its estimation can be formulated using negative log-likelihood, wherein error propagation can be carried out with respect to the first and/or second continuous function. In this way, continuous information on the expected trajectory 28 is provided, which is indicated by a continuous line in FIG. 1.

The object 16 is an autonomous vehicle comprising a computer system for generating suitable control actions so that the vehicle navigates safely, for example on the road 10 as shown in FIG. 1.

Figure 2:
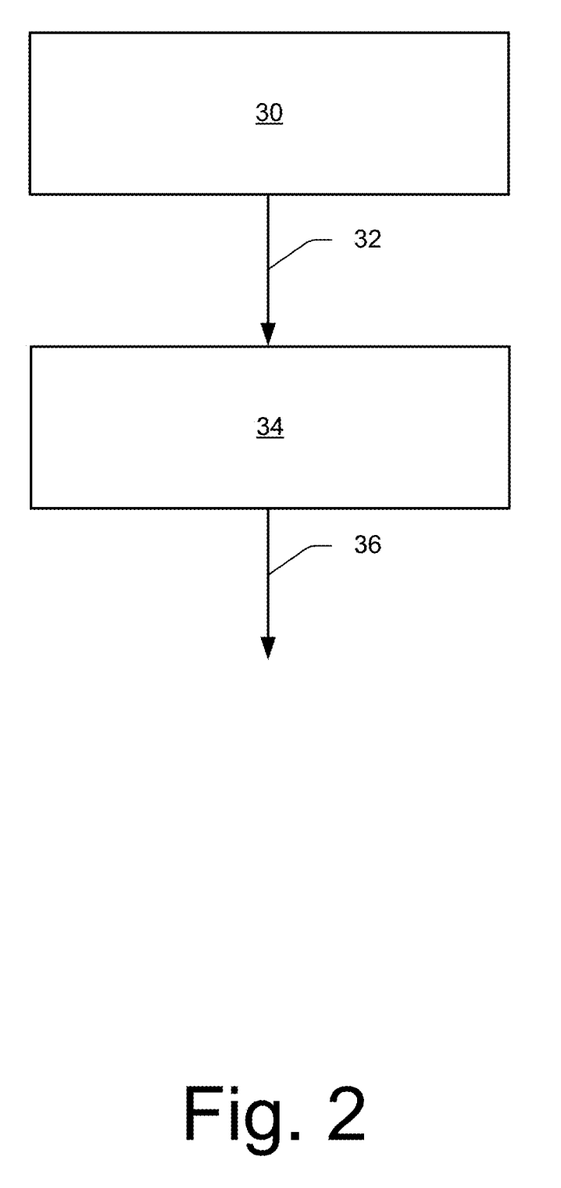
FIG. 2 steps of a method for determining an expected trajectory of an object.

Determining the first, second and third continuous function including their parameter values is now described in greater detail in connection with FIG. 2. In step 30, sensor data 32 is determined, wherein the sensor data 32 is related to the expected trajectory 28 of the object 18. In step 34, a plurality of parameter values 36 are determined for a continuous function, wherein the parameter values and the continuous function represents continuous information on the expected trajectory 28. The first continuous function is a fourth-order polynomial function, namely $f(t)=a*t^4+b*t^3+c*t^2+d*t+$, wherein [a, b, c, d, e] is the first set of parameters and t is a continuous-time variable. It is understood that t can be set to any desired real value within a definition range, hence t is not limited to discrete time instances in the sense that the function $f(t)$ can be evaluated for any real value of t. The first set of parameters are set to a first set of parameter values, e.g. [a=2, b=4, c=3, d=1, e=0]. The first function $f(t)$ describes the trajectory 28 in a first spatial dimension, e.g. the x-dimension of a Cartesian coordinate system. This is, f (t) gives the expected x-coordinate position of the object 18 for a given value of t. Likewise, the second continuous function gives the expected y-coordinate position of the object 18 for a given value of t. In more general terms, the second continuous function describes the trajectory 28 in a second spatial dimension. The second continuous function is $g(t)=i*t^4+j*t^3+k*t^{2+1}*t+r$, wherein [i, j, k, l, r] is the second set of parameters, which are set to the second set of parameter values, e.g. [i=1, j=2, k=4, l=3, r=0]. It is understood that the position of the object 18 can now be described by a coordinate pair [f(t); g(t)] for a given value of t and with the parameters being set to the assigned parameter values. It is further understood that the functions f(t) and g(t) are equivalent due to the same mathematical structure.

The confidence in the first and second sets of parameter values for the first and second continuous functions is expressed by a third set of parameter values for the third continuous function, e.g. $h(t)=m*t^4+n*t^3+o*t^2+p*t+q$, wherein [m, n, o, p, q] is the third set of parameters, which are set to the third set of parameter values, e.g. [m=1, n=1, o=2, p=5, q=0]. In one example, the rate at which the steps 30 and 34 are carried out is varied on the basis of the third continuous function and the third set of parameter values, for example if loss(t) is low, e.g. below a predefined threshold, the repetition rate can be reduced by an offset or factor, wherein otherwise the repetition rate is not reduced. This can be carried out in dependence of t, wherein an average value can be determined for a given range of t.

What is claimed is:

1. A computer-implemented method for determining continuous information on an expected trajectory of an object and controlling a vehicle based on the expected trajectory, the computer-implemented method comprising:
   obtaining sensor data related to the expected trajectory of the object, the sensor data representing a vicinity of the vehicle with the object located in the vicinity;
   determining, by a computer system of the vehicle using a machine-learning model, at least one parameter value for a continuous function based on the sensor data, the continuous function and the at least one parameter value representing the continuous information on the expected trajectory of the object and including a confidence value, the confidence value including a variance in an expected error distribution for the expected trajectory that represents a confidence in an accuracy of the expected trajectory of the object, the determining including repeatedly determining the at least one parameter value at a repetition rate, and adjusting the repetition rate based on the confidence value included in the at least one parameter value such that, during periods where the confidence in the accuracy of the expected trajectory is higher than a threshold, a processing effort of the computer system to perform the determining of the least one parameter value is reduced by decreasing the repetition rate; and
   autonomously controlling, by the computer system, the vehicle based on the continuous information on the expected trajectory of the object,
      wherein the at least one parameter value includes at least one first parameter value, at least one second parameter value and at least one third parameter value, and
      wherein a first continuous function and the at least one first parameter value represent the expected trajectory of the object in a first dimension, a second continuous function and the at least one second parameter value represent the expected trajectory of the object in a second dimension, and the third continuous function and at least one third parameter value represent the confidence for the expected trajectory of the object.

2. The computer-implemented method of claim 1, wherein the sensor data is determined at a first time, the sensor data being related to the expected trajectory of the object at a second time, wherein the continuous function and the at least one parameter value represent the continuous information on the expected trajectory of the object at the second time.

3. The computer-implemented method of claim 1, wherein the continuous function represents a function value based on a continuous variable and at least one additional parameter, the at least one additional parameter set based on the at least one parameter value.

4. The computer-implemented method of claim 1, wherein the machine-learning model comprises an artificial neural network.

5. The computer-implemented method of claim 4, wherein the artificial neural network comprises a plurality of layers, wherein the at least one parameter value comprises a plurality of secondary parameter values, wherein at least some of the plurality of secondary parameter values are respectively determined by a respective one of the plurality of layers of the artificial neural network or wherein at least some of the plurality of secondary parameter values are determined by a single layer of the artificial neural network.

6. The computer-implemented method of claim 1, wherein the continuous function forms a polynomial function.

7. The computer-implemented method of claim 6, wherein the polynomial function has a degree of at least one.

8. The computer-implemented method of claim 1, wherein determining the at least one parameter value does not comprise interpolating between data points of the expected trajectory of the object.

9. A system comprising:
at least one sensor for determining sensor data, the sensor data representing a vicinity of a vehicle with at least one object located in the vicinity; and
one or more processors configured to:
obtain the sensor data related to an expected trajectory of the object,
determine, using a machine-learning model, at least one parameter value for a continuous function based on the sensor data, the continuous function and the at least one parameter value representing continuous information on the expected trajectory of the object and including a confidence value, the confidence value including a variance in an expected error distribution for the expected trajectory that a confidence in an accuracy of the expected trajectory of the object, the one or more processors configured to determine the at least one parameter value by repeatedly determining the at least one parameter value at a repetition rate, and adjusting the repetition rate based on the confidence value included in the at least one parameter value such that, during periods where the confidence in the accuracy of the expected trajectory is higher than a threshold, a processing effort of the system to perform the determining of the least one parameter value is reduced by decreasing the repetition rate, and
autonomously control the vehicle based on the continuous information on the expected trajectory of the object,
wherein the at least one parameter value includes at least one first parameter value, at least one second parameter value and at least one third parameter value, and
wherein a first continuous function and the at least one first parameter value represent the expected trajectory of the object in a first dimension, a second continuous function and the at least one second parameter value represent the expected trajectory of the object in a second dimension, and the third continuous function and at least one third parameter value represent the confidence for the expected trajectory of the object.

10. The system of claim 9, wherein the sensor data is determined at a first time, the sensor data being related to the expected trajectory of the object at a second time, wherein the continuous function and the at least one parameter value represent the continuous information on the expected trajectory of the object at the second time.

11. The system of claim 9, wherein the continuous function represents a function value based on a continuous variable and at least one additional parameter, the at least one additional parameter set based on the at least one parameter value.

12. The system of claim 9, wherein the machine-learning model comprises an artificial neural network.

13. The system of claim 12, wherein the artificial neural network comprises a plurality of layers, wherein the at least one parameter value comprises a plurality of secondary parameter values, wherein at least some of the plurality of secondary parameter values are respectively determined by a respective one of the plurality of layers of the artificial neural network or wherein at least some of the plurality of secondary parameter values are determined by a single layer of the artificial neural network.

14. A non-transitory computer-readable medium comprising computer-executable instructions that, when executed, cause a processor of a computer system to:
obtain sensor data related to an expected trajectory of an object, the sensor data representing a vicinity of a vehicle with the object located in the vicinity;
determine, using a machine-learning model, at least one parameter value for a continuous function based on the sensor data, the continuous function and the at least one parameter value representing continuous information on the expected trajectory of the object and including a confidence value, the confidence value including a variance in an expected error distribution for the expected trajectory that a confidence in an accuracy of the expected trajectory of the object, the processor configured to determine the at least one parameter value by repeatedly determining the at least one parameter value at a repetition rate, and adjusting the repetition rate based on the confidence value included in the at least one parameter value such that, during periods where the confidence in the accuracy of the expected trajectory is higher than a threshold, a processing effort of the computer system to perform the determining of the least one parameter value is reduced by decreasing the repetition rate; and
autonomously control the vehicle based on the continuous information on the expected trajectory of the object,
wherein the at least one parameter value includes at least one first parameter value, at least one second parameter value and at least one third parameter value, and
wherein a first continuous function and the at least one first parameter value represent the expected trajectory of the object in a first dimension, a second continuous function and the at least one second parameter value represent the expected trajectory of the object in a second dimension, and the third continuous function and at least one third parameter value represent the confidence for the expected trajectory of the object.

* * * * *